(12) United States Patent
Mouille

(10) Patent No.: US 6,287,076 B1
(45) Date of Patent: Sep. 11, 2001

(54) ROTOR BLADE, IN PARTICULAR FOR HELICOPTER ANTITORQUE TAIL ROTOR

(76) Inventor: René Mouille, 7 Chemin du Moulin de Testas, 13090 Aix en Provence (FR)

( * ) Notice: Subject to any disclaimer, the term of this patent is extended or adjusted under 35 U.S.C. 154(b) by 0 days.

(21) Appl. No.: 09/423,706

(22) PCT Filed: Mar. 16, 1999

(86) PCT No.: PCT/FR99/00581

§ 371 Date: Nov. 12, 1999

§ 102(e) Date: Nov. 12, 1999

(87) PCT Pub. No.: WO99/47417

PCT Pub. Date: Sep. 23, 1999

(30) Foreign Application Priority Data

Mar. 16, 1998 (FR) .................................. 98 03172

(51) Int. Cl.⁷ .................................................. B64C 11/12
(52) U.S. Cl. ...................................... 416/134 A; 416/248
(58) Field of Search ............................. 416/134 A, 106, 416/107, 210 R, 248

(56) References Cited

U.S. PATENT DOCUMENTS

| 4,244,677 | * | 1/1981 | Noehren et al. | 416/134 A |
| 4,273,511 | * | 6/1981 | Mouille et al. | 416/134 A |
| 4,886,419 | | 12/1989 | McCafferty . | |
| 5,330,322 | * | 7/1994 | Aubry | 416/134 A |
| 5,478,204 | * | 12/1995 | Desjardins et al. | 416/168 R |

FOREIGN PATENT DOCUMENTS

| 0331791 | 9/1989 | (EP) . |
| 1593008 | 5/1970 | (FR) . |
| 8002407 | 11/1980 | (WO) . |
| 0549455 | 6/1993 | (WO) . |

OTHER PUBLICATIONS

PCT International Search Report dated Jun. 24, 1999.

* cited by examiner

*Primary Examiner*—Edward K. Look
*Assistant Examiner*—Ninh Nguyen
(74) *Attorney, Agent, or Firm*—Stevens, Davis, Miller & Mosher, LLP

(57) ABSTRACT

A rotor blade, in particular for a helicopter anti-torque tail rotor, includes a rotable blade shank mounted in a rotor hub, which allows the blade to rotate about its step axis (P—P). The rotor shank is fixed to the rotor hub via a member capable of elastic twist deformation about the step axis. The blade shank is hollow and open at its inner end, thereby defining an internal recess, and the member capable of elastic deformation is an elastic stop housed inside the internal recess. The elastic stop functions like a spherical mounting with limited action and is centered on the step axis, and a rigid tie rod connects the elastic stop to the rotor hub.

14 Claims, 3 Drawing Sheets

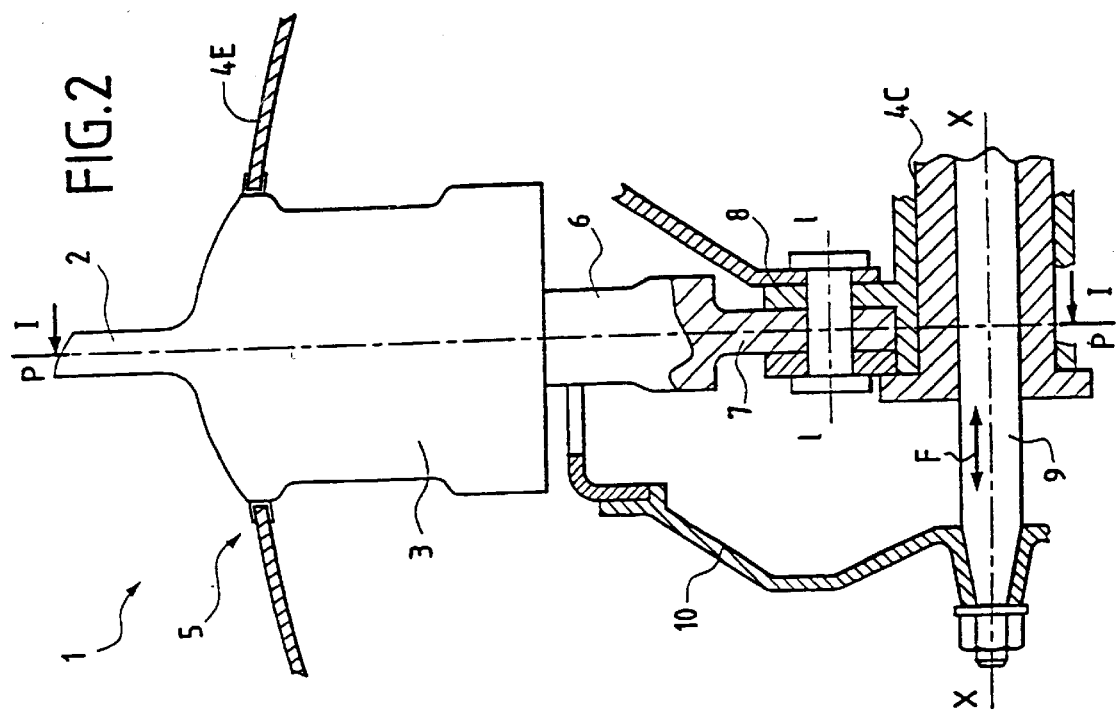
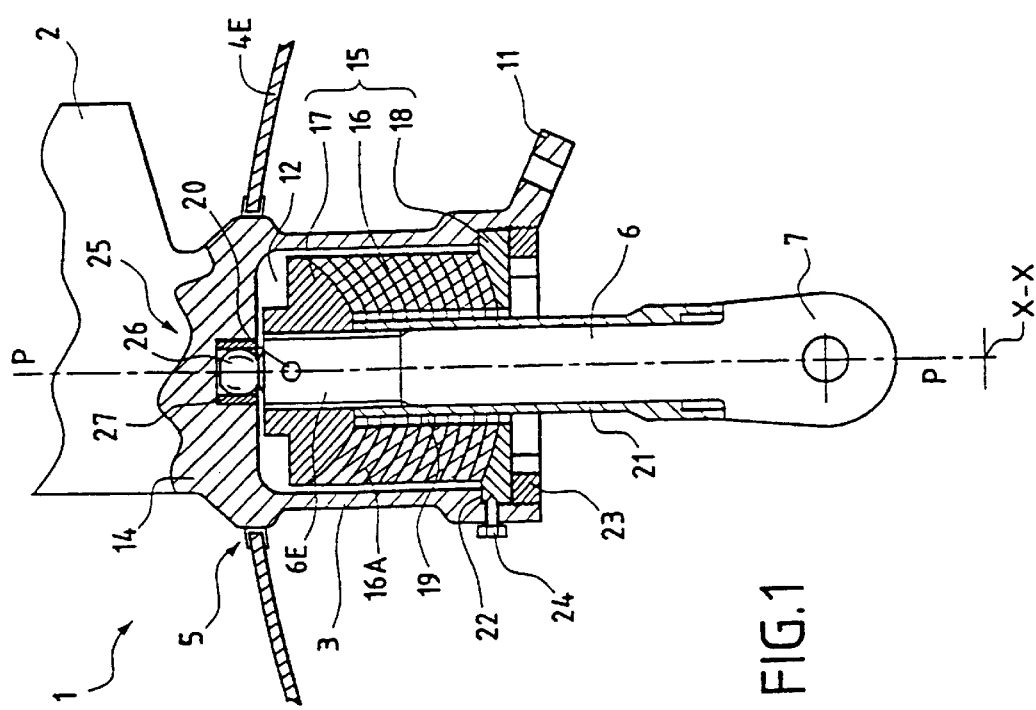

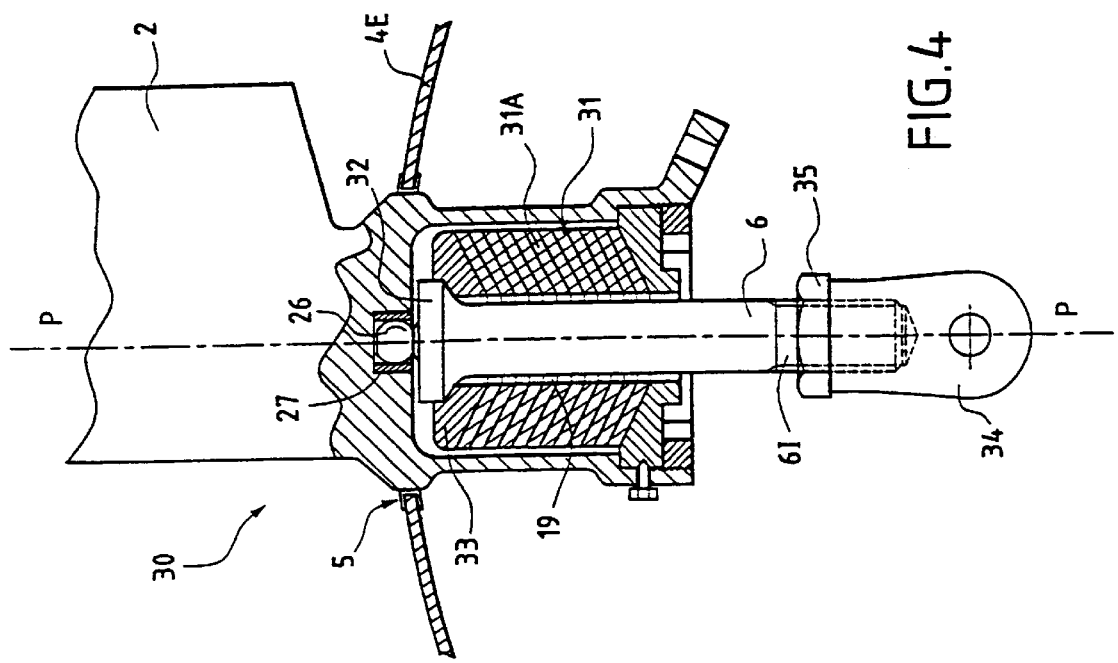
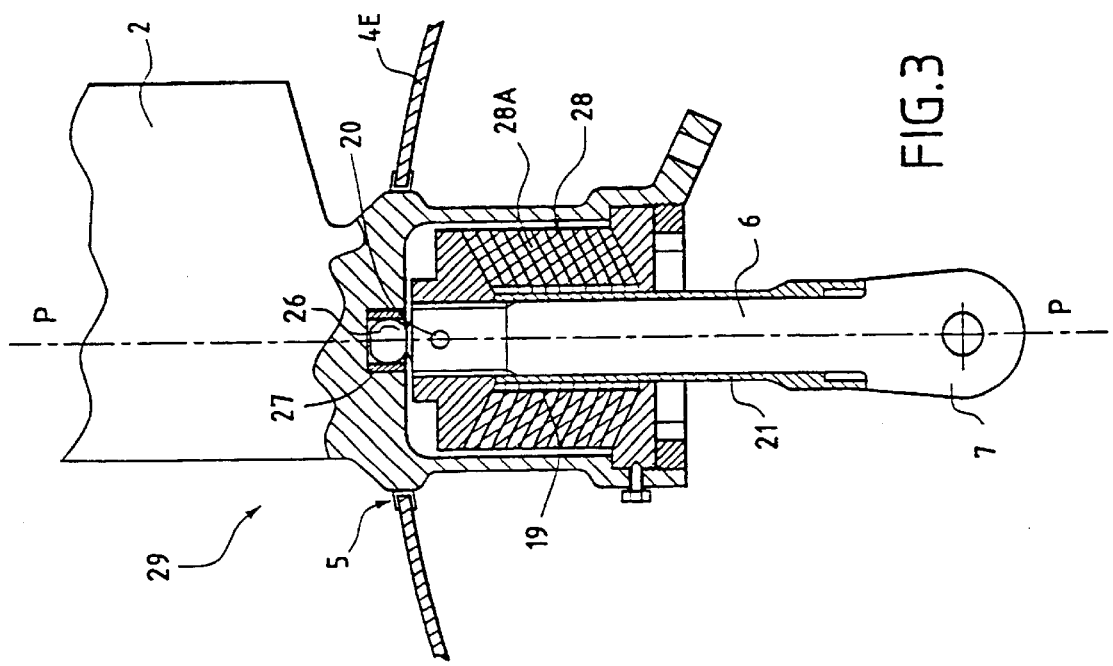

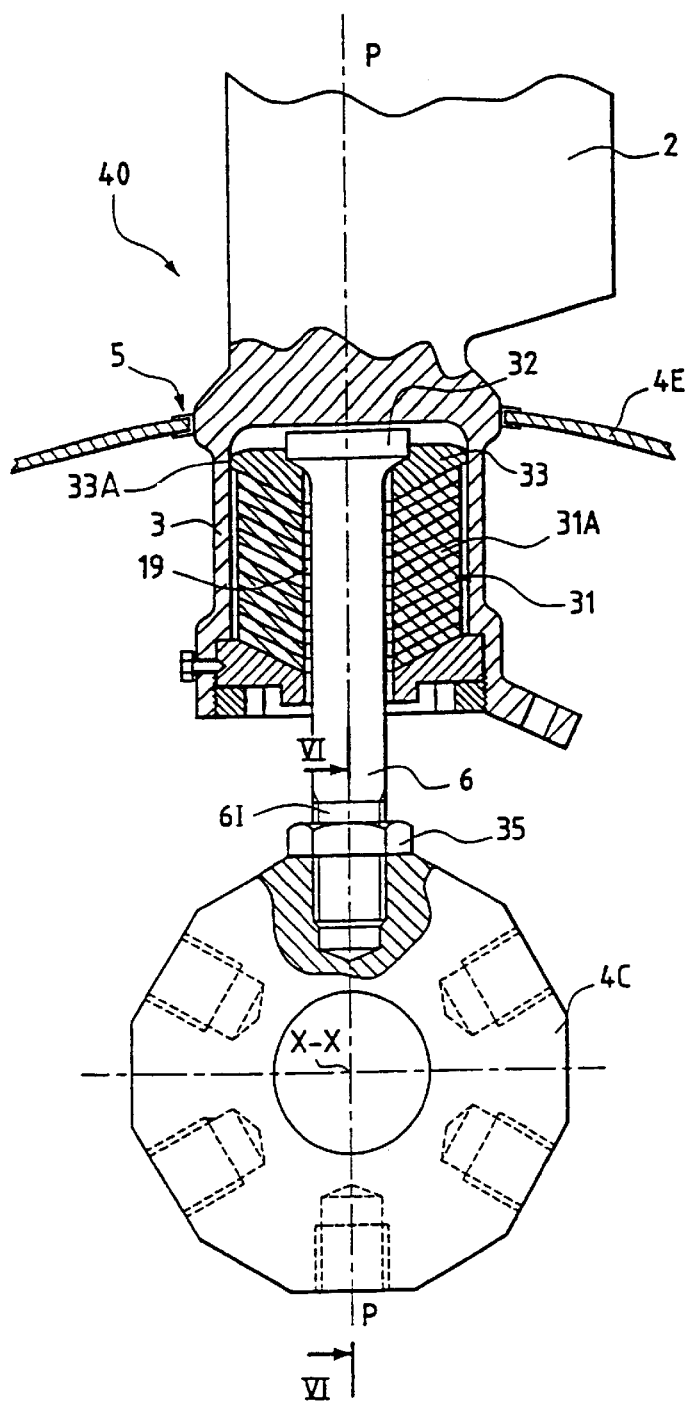
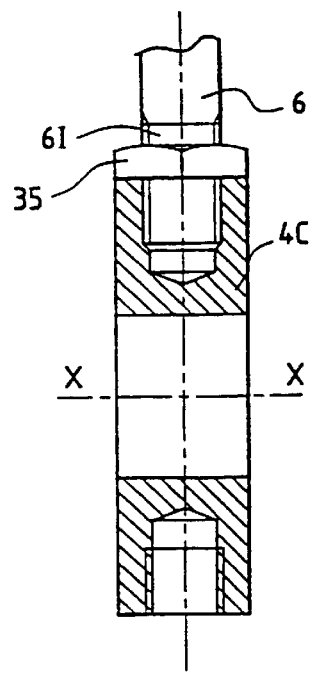

ROTOR BLADE, IN PARTICULAR FOR HELICOPTER ANTITORQUE TAIL ROTOR

BACKGROUND OF THE INVENTION

1. Field of the Invention

The present invention relates to rotor blades, particularly those intended for a shrouded antitorque tail rotor (fenestron™—registered trademark of the French company EUROPCOPTER) for a helicopter. It relates more specifically to the device for attaching such a blade to the hub of said rotor.

2. Description of the Related Art

It is known that antitorque tail rotor blades for helicopters are generally set by their root into the hub of said rotor, by means of two bearings which are separated from one another along the length of said root. They are also attached near the center of the hub by members which are elastically deformable in terms of torsion, which allow the angle of incidence to be varied while at the same time withstanding the centrifugal force which is exerted on the blades as they rotate.

These members which are elastically deformable in terms of torsion are either metallic (for example a bundle of superimposed leaves made of stainless steel) or made of a fiber-resin composite (it then being possible for each elastic member to be an extension of a blade, itself made of composite), depending on the design of said blades.

Whatever the design of these members which are elastically deformable in terms of torsion, these members constitute critical elements of said rotors because they experience high tensile stresses under the action of centrifugal force and, above all, because they experience high torsional fatigue loads for controlling the incidence, and so, in order to reduce the torsional stresses and extend the life of said members, these members have to be made as long as possible, although this increases the radial size of the rotor hub.

SUMMARY OF THE INVENTION

The object of the present invention is to overcome these drawbacks by allowing a rotor of this kind to be produced with a small radial size, while at the same time eliminating any risk of breakage of the members which are elastically deformable in terms of torsion.

To this end, according to the invention, the rotor blade, particularly for the antitorque tail rotor of a helicopter, comprising:

- a blade root mounted so that it can rotate in the hub of said rotor, so as to allow said blade to rotate about its pitch axis; and
- means of attaching said blade root to said rotor hub, including a member which is elastically deformable in terms of torsion about said pitch axis, is noteworthy in that:

said blade root is hollow and open at its internal end;

said member which is elastically deformable in terms of torsion consists of an elastic stop housed in said blade root and is capable of acting as a limited-action ball joint centered on said pitch axis; and a rigid tie rod connects said elastic stop to said rotor hub.

Thus, such an elastic stop eliminates any danger of breakage through torsional fatigue. It can be robustly engineered and can offer a long service life without appreciable wear and without ever leading to sudden fatigue failure.

Furthermore, an elastic stop of this kind is particularly compact and therefore takes up a small amount of space, especially radially with respect to the rotor.

However, in order to reduce the radial size of the rotor still further, it is advantageous, said elastic stop having, in the known way, a number of laminated elements made of elastomer arranged between two armatures, for:

said elastic stop to be arranged inside said blade root in such a way that one of its armatures, known as the outer armature, is on the same side as the profiled part of said blade, while the other of said armatures, known as the inner armature, is on the same side as the axis of the rotor;

said elastic stop to have a central recess which is coaxial with said pitch axis;

said rigid tie rod to pass with clearance through said central recess and its outer end, which is on the same side as said profiled part of the blade, to be secured to the outer armature of said elastic stop; and the inner armature of said elastic stop, through which said tie rod passes with clearance, to be secured to the inner end of the blade root which is on the same side as the axis of the rotor.

Thus, the small size of the elastic stop and of the tie rod makes it possible to greatly reduce the diameter of the rotor hub supporting the bearings in which the blades are supported, and this leads to an improvement in the thrust performance and, above all, to a reduction in the mass of the hub, and of the support for the gearbox (which drives the rotation of said rotor) which is in line with and behind said hub.

Said elastic stop may be spherical, that is to say that its laminated elastomer elements are then spherical and centered on said pitch axis. However, given the small excursion of said elastic stop, it may be conical, that is to say that its laminated elements are also conical and centered on said pitch axis.

Furthermore, it is advantageous to provide a ball joint-type support, centered on said pitch axis, between the outer end of said tie rod and the outer end of said blade root.

Thus, by creating this kind of support for the outer end of the tie rod inside said blade root, said tie rod can be immobilized and the elastic stop, loaded axially with centrifugal force, is subjected only to the torsion which corresponds to the variations in incidence.

Moreover, by virtue of this support, it becomes possible to use just one bearing, arranged at the outer end of said blade root, for articulating said blade root to the hub. This is because, in rotation, the flapping movements of the blade are small (less than 1°) and the corresponding deformations of the elastic stop lead to very small movements. Furthermore, when stationary, the flapping movements of the blade are limited by contact between the inner armature of the elastic stop and said tie rod.

It will be readily understood that omitting one blade bearing—compared with the prior art—appreciably lightens and simplifies the rotor hub which may, for example, then be made by pressing, like a saucepan. Furthermore, omitting one bearing eliminates the majority of the control efforts, which majority results from the friction in the bearings which are highly loaded because of the way the blade is fitted. It is therefore no longer necessary to use servocontrol, without this entailing having to resort to heavy balancing masses on the blades. This too constitutes a simplification and a reduction in weight. Thus, by virtue of the present invention, the means of attaching the blades are simpler, more compact, more dependable and less expensive than those of the prior art.

The figures of the appended drawing will make it easy to understand how the invention may be achieved. In these figures, identical references denote similar elements.

BRIEF DESCRIPTION OF THE DRAWINGS

FIG. 1 is a view, partially in longitudinal section, corresponding to the line I—I of FIG. 2, of a blade according to the present invention, equipped with its attachments means FIG. 2 is an exterior view, rotated through 90° compared with FIG. 1, of the blade shown in said FIG. 1.

FIGS. 3, 4 and 5 illustrate, partially in section, alternative forms of the blade of FIGS. 1 and 2.

FIG. 6 is a part section corresponding to the line VI—VI of FIG. 5.

DETAILED DESCRIPTION OF THE INVENTION

The rotor blade 1 according to the present invention and depicted in FIGS. 1 and 2 includes a profiled part 2 (shown partially) and a blade root 3. It is intended, together with other identical blades, to form the antitorque tail rotor of a helicopter, the rotor rotating about an axis X—X and having a hub consisting of a central part 4C (depicted only in FIG. 2) and an outer part 4E.

Said blade root 3 is mounted so that it can rotate in the outer part of the hub 4E by means of a single bearing 5 arranged at the same end of said profiled part 2 of the blade, so as to allow said blade 1 to rotate about its pitch axis P—P. In addition, said blade 1 is attached to the central hub part 4C by means of a tie rod 6. For this purpose, the free end 7 of said tie rod 6 is shaped as a clevis element and cooperates with a complementary clevis element 8 secured to said central part 4C so as to attach said blade to said hub, the clevis 7, 8 having an axis l—l parallel to the axis X—X. In a known way, as depicted in FIG. 2, a rod 9 which is coaxial with the axis X—X of the rotor and which can slide parallel to said axis (see double-headed arrow F), controls the rotation of said blade 1 about its pitch axis P—P, via a link 10 which is secured, at one end, to said rod 9 and, at the other end, to an eccentric finger 11 borne by the blade root 3.

According to the Present Invention the blade root 3 is hollow and defines an interior recess 12 open on the inside (in the direction of the axis X—X) and sealed off on the outside (in the direction of the profiled part 2) by a closed end 14; and housed inside the interior recess 12 of the blade root 3 is a spherical elastic stop 15 which includes a set 16 of laminated elastomer elements 16A arranged between an outer armature 17 and an inner armature 18 and which is inserted between the profiled part 2 of the blade 1 and the tie rod 6 so as to act as a member which is elastically deformable in terms of torsion about the pitch axis P—P.

The spherical elastic stop 15 is centered on said pitch axis P—P and is capable of a limited ball joint-type movement. It includes a central recess 19 coaxial with the pitch axis P—P.

The rigid tie rod 6 passes with clearance through the central recess 19 and its outer end 6E is fixed to the outer armature 17 of the elastic stop 15. This outer armature 17 is, for example, made of steel and fastening may be achieved, as depicted in FIG. 1, by screwing the threaded outer end 6A into the outer armature 17, which forms a nut. A pin 20 locks said rigid tie rod against rotation relative to the outer armature 17.

A light alloy spacer piece 21 is slipped over the rigid tie rod 6 between the clevis element 7 and the outer armature 17, to act as a stop for the positioning of the latter. The spacer piece 21 also makes it possible to ensure that the tie rod has the correct length when screwing together the assembly 6–17.

Said tie rod and said spacer piece 21 pass with clearance through the inner armature 18 of the elastic stop 15 and this armature is secured to the inner end of the blade root 3. For this purpose, this inner armature 18 is immobilized in the recess 12 of the blade root 3 between a shoulder 22 and a part 23 screwed into said recess 12. The rotation-wise positioning of the inner armature 18 may be achieved using various devices, illustrated diagrammatically in FIG. 1 as a set screw 24.

Furthermore, a support point 25, centered on the pitch axis P—P is provided between the outer end 6E of the tie rod 6 and the outer end of the blade root 3. In the embodiment of FIG. 1, this support point 25 is formed by a ball 26 secured to the tie rod 6 and engaged in a cage 27 housed in the closed end 14 of the recess 12.

The movements of the ball of the spherical stop 15 are very small, 0.7° at most, and furthermore they are limited by the clearance there is in the central recess 19 between the inner armature 18 and the tie rod 6/spacer piece 21 assembly. In consequence, the spherical stop 15 may, as illustrated in FIG. 3, be replaced with a simpler stop 28 with conical elements 28A. In this FIG. 3, the alternative form 29 is identical to the embodiment 1 except for the fact that the spherical stop 15 is replaced by the conical stop 28.

In the alternative form 30 of the rotor blade, according to the present invention and shown in FIG. 4, we again find the elements already described with reference to FIG. 1, with the following exceptions:

the stop 31 is no longer spherical but is conical (as in FIG. 3), that is to say that its elastomer elements 31A are conical and centered on the axis P—P;

the tie rod 6 at its outer end has a poppet-valve head 32 retaining the conical stop 31, resting on the outer side of the outer armature 33 of said stop; and the clevis element 34, intended to connect the tie rod 6 to the central part 4C of the hub is screwed with a lock nut 35—on to the threaded inner end 6I of the tie rod 6.

In this case, the outer armature 33, which no longer has a screw thread, may be made of light alloy.

The embodiment 40 of the rotor blade, according to the present invention and shown in FIGS. 5 and 6, is similar to the blade 30 of FIG. 4, with the following differences:

the support point 25, 26, 27 is omitted and replaced by an annular spherical bearing surface 33A made at the periphery of the outer armature 33 of the elastic stop 31 and resting on the wall of the inner recess 12;

the threaded inner end 6I of the tie rod 6 is connected directly by screwing to the central hub part 4C, without the interposition of clevis element 34, but with the lock nut 35.

What is claimed is:

1. A blade for an antitorque tail rotor of a helicopter, said blade having a profiled part, said tail rotor rotating about an axis of rotation and having a hub, said blade comprising:

a blade root mounted to rotate in said hub and to facilitate rotation of said blade about its pitch axis, said blade root having an outer end and having an inner end on the same side as said axis of rotation, said blade root being hollow at its inner end, thereby defining an interior recess;

an elastic stop having laminated elastomer elements arranged between an inner armature and an outer armature, said elastic stop for acting as a limited-action ball joint centered on said pitch axis, wherein said elastic stop:

is arranged inside said blade root so that said outer armature is on the same side as said profiled part of said blade, while the inner armature is on the same side as said axis of rotation and is secured to said inner end of said blade root, and has a central recess which is coaxial with said pitch axis; and a rigid tie rod having an inner end and an outer end, said tie rod connecting said elastic stop to said hub, wherein said tie rod passes with clearance through said central recess, and wherein the outer end of said tie rod is on the same side as said profiled part of said blade and is secured to said outer armature.

2. A blade according to claim 1, characterized in that the laminated elastomer elements of said elastic stop are spherical.

3. A blade according to claim 1, characterized in that the laminated elastomer elements of said elastic stop are conical.

4. A blade according to claim 1, characterized in that a ball joint-type support, centered on said pitch axis, is provided between the outer end of said tie rod and the outer end of said blade root, wherein the outer end of said blade root is on the same side as said blade.

5. A blade according to claim 4, characterized in that said ball joint-type support includes a ball secured to the outer end of said tie rod and engaged in a cage made in the closed end of said blade root interior recess.

6. A blade according to claim 4, characterized in that said ball-type support includes an annular spherical bearing surface made at the periphery of said outer armature of the elastic stop and resting against the wall of said interior recess.

7. A blade according to claim 1, characterized in that said blade root is journal-mounted on said rotor hub by means of a single bearing located on the outer end side of said blade root.

8. A blade according to claim 1, characterized in that said rigid tie rod is screwed into said outer armature of the elastic stop.

9. A blade according to claim 8, characterized in that a spacer piece is arranged around the rigid tie rod between the inner end thereof and said outer armature of the elastic stop.

10. A blade according to claim 1, characterized in that the outer end of the rigid tie rod is shaped like the head of a poppet valve and retains said elastic stop.

11. A blade according to claim 1, characterized in that the inner end of said tie rod bears a clevis element capable of cooperating with a complementary clevis element borne by said rotor hub so as to attach said blade root to said hub.

12. A blade according to claim 11, characterized in that said clevis element of the tie rod is secured to the inner end thereof.

13. A blade according to claim 11, characterized in that said clevis element of the tie rod is screwed onto the threaded inner end of said tie rod.

14. A blade according to claim 1, characterized in that the inner end of said tie rod is threaded and is connected directly to the rotor hub by screwing.

\* \* \* \* \*